US006547026B2

(12) United States Patent
Kamen et al.

(10) Patent No.: US 6,547,026 B2
(45) Date of Patent: Apr. 15, 2003

(54) SAFETY SEPARATION SYSTEM

(75) Inventors: Dean L. Kamen, Bedford, NH (US); Robert Ambrogi, Manchester, NH (US); John B. Morrell, Manchester, NH (US); Christopher C. Langenfeld, Nashua, NH (US); Stanley B. Smith, III, Henniker, NH (US); James H. Steenson, Jr., Derry, NH (US)

(73) Assignee: Deka Products Limited Partnership, Manchester, NH (US)

(*) Notice: Subject to any disclaimer, the term of this patent is extended or adjusted under 35 U.S.C. 154(b) by 30 days.

(21) Appl. No.: 09/784,529

(22) Filed: Feb. 15, 2001

(65) Prior Publication Data
US 2001/0020556 A1 Sep. 13, 2001

Related U.S. Application Data

(63) Continuation-in-part of application No. 09/168,551, filed on Oct. 8, 1998, now abandoned.
(60) Provisional application No. 60/061,974, filed on Oct. 14, 1997.

(51) Int. Cl.$^7$ .............................................. B60K 28/14
(52) U.S. Cl. ...................... 180/282; 180/326; 280/5.28
(58) Field of Search ................. 180/282, 271, 180/907, 326, 21, 218; 280/304.1, 657, 5.28; 297/344.1, 344.11, DIG. 10; 414/921

(56) References Cited

U.S. PATENT DOCUMENTS

| | | | | |
|---|---|---|---|---|
| 2,929,637 A | * | 3/1960 | Papacota | 180/274 |
| 3,162,479 A | * | 12/1964 | Hewitt | 180/271 |
| 3,508,783 A | * | 4/1970 | Schlanger | 180/232 |
| 3,589,466 A | * | 6/1971 | Dudley | 180/274 |
| 3,710,682 A | | 1/1973 | Hansen et al. | 244/122 |
| 3,837,422 A | * | 9/1974 | Schlanger | 244/122 AE |
| 4,359,200 A | | 11/1982 | Brevard et al. | 244/122 |
| 5,207,286 A | | 5/1993 | McKelvey | 180/13 |
| 5,222,695 A | * | 6/1993 | Lake | 701/45 |
| 5,293,950 A | | 3/1994 | Marliac | 180/11 |
| 5,490,066 A | * | 2/1996 | Gioutsos et al. | 701/45 |
| 5,556,121 A | | 9/1996 | Pillot | 280/304.1 |
| 5,632,502 A | | 5/1997 | Oppitz et al. | 280/689 |
| 5,701,965 A | | 12/1997 | Kamen et al. | 180/7.1 |
| 5,730,236 A | | 3/1998 | Miller et al. | 180/65.1 |
| 5,738,378 A | * | 4/1998 | Yazejian | 280/784 |
| 5,826,687 A | | 10/1998 | Bungeler et al. | 188/296 |
| 5,924,720 A | | 7/1999 | Keehne | 280/657 |
| 5,944,131 A | | 8/1999 | Schaffner et al. | 180/65.1 |
| 5,988,304 A | | 11/1999 | Behrendts | 180/65.1 |

* cited by examiner

Primary Examiner—Paul N. Dickson
Assistant Examiner—David R. Dunn
(74) Attorney, Agent, or Firm—Bromberg & Sunstein LLP

(57) ABSTRACT

A safety mechanism for a personal vehicle that provides for separation of the motion of a body support from a ground contacting assembly of the vehicle in case of accident. In one embodiment, the body support is attached to the ground contacting module via a slide mechanism that permits the body support to continue upright motion despite overturning of the ground contacting assembly in order to prevent injury to the passenger. Another embodiment provides for coupling of the body support or the ground contacting assembly via either a real or virtual pivot located above the respective centers of mass of the body support and ground contacting assembly.

15 Claims, 21 Drawing Sheets

SAFETY SEPARATION SYSTEM

The present application is a continuation-in-part of U.S. Ser. No. 09/168,551, filed Oct. 8, 1998, now abandoned, and claims priority from U.S. Provisional Application, Serial No. 60/061,974, filed Oct. 14, 1997, which applications are both incorporated herein by reference.

FIELD OF THE INVENTION

The present invention pertains to a vehicular safety system and method, and, in particular, to a vehicular safety system and method for preventing injury to the passenger of a motorized vehicle by separating a body support from the ground contacting assembly of the vehicle.

BACKGROUND ART

Vehicles, whether for the transportation of humans or other types of payloads, may lack stability, either by design or due to the nature of their use. Many such vehicles are particularly susceptible to tipping, whether due to collision, mechanical failure, sudden turns, steep inclines, or an encounter with a surface irregularity for which the mechanism is incapable of compensating. Indeed, any personal vehicle may tip when sufficiently severe surface irregularities are encountered. Under these circumstances, the occupant or contents of the vehicle must be protected so that injury does not result from propulsion of the occupant toward the ground or other solid obstacle. Unless protected, the occupant may also sustain injury due to trauma or crushing if the vehicle, which is relatively massive, overturns or is propelled, due to its inertia, into a solid obstacle or on top of the occupant.

Methods are known for absorbing or diverting kinetic energy inherent in the motion of a vehicle to insure that it is not converted to propulsion of the occupant of the vehicle into a solid body such as the ground. Common examples are bumpers on cars, which absorb kinetic energy in crumpling metal, and airbags, which couple the mechanical energy of car passengers into the compression and redistribution of gas in a bag before enough time has elapsed for the bodies of the passengers to hit the steering wheel or windshield of the car with resulting serious injury.

Other means are known to employ the kinetic energy present in a massive subcomponent of the vehicle, to inflate a bellows or other cushion to protect the vehicle occupants in the case of a head-on collision.

In an unenclosed vehicle such as a wheelchair, for example, it is often safer to divert the passenger from the path of the center of mass of the vehicle than to trap him between the mass of the vehicle, moving with its attendant momentum, and its ultimate position of repose, such as at a solid surface after a crash.

SUMMARY OF THE INVENTION

In accordance with one aspect of the invention, in one of its embodiments, there is provided a safety mechanism for protecting a passenger of a vehicle in a situation wherein the vehicle undergoes undesirable acceleration. The vehicle is one which has a ground contacting assembly and a body support with a center of gravity (CG). The safety mechanism has a connector for coupling the body support and the ground contacting assembly. It also has a release for decoupling the motion of the CG of the body support along at least one axis from the motion of the ground contacting assembly. An actuator for unleashing the release in response to an undesired acceleration of the vehicle is also provided.

In accordance with an alternate embodiment of the invention, the connector allows free motion of the body support with respect to the ground contacting assembly, and may be a pneumatic cylinder or a slide track. The safety mechanism may also have a rotary actuator, including a motor, for rotating the body support with respect to the ground contacting assembly such as to counteract the effect of a roll of the ground contacting assembly on the orientation of the body support with respect to a vertical direction.

In other embodiments of the invention, the safety mechanism has a pilot wheel assembly coupled to the body support. The pilot wheel assembly may include at least one wheel, and a self-leveling mechanism. The release may include a means for storing mechanical energy, such as a spring or torsion spring, coupled to at least one of the ground contacting assembly and the body support such that the mechanical energy is used to decouple the motion of the CG of the body support from the motion of the ground contacting assembly.

In accordance with further embodiments of the invention, the safety mechanism may have a reservoir of mechanical energy coupled to at least one of the ground contacting assembly and the body support such that the mechanical energy is used to decouple the motion of the CG of the body support from the motion of the ground contacting assembly.

In accordance with another aspect of the invention, a method is provided for protecting a passenger of a vehicle having a ground contacting assembly and a body support in a situation wherein the vehicle undergoes undesirable acceleration. The method has the steps of sensing the undesired acceleration and decoupling the motion of the center of gravity of the body support from the motion of the ground contacting assembly with respect to at least one axis.

BRIEF DESCRIPTION OF THE DRAWINGS

The invention will be more readily understood by reference to the following description, taken with the accompanying drawings, in which.

DETAILED DESCRIPTION OF SPECIFIC EMBODIMENTS

The present invention provides a mechanical strategy for handling the fall in any direction of a personal vehicle, such as a wheelchair-type vehicle.

Referring now to FIGS. 1 through 19, wherein like elements are designated by identical numerals, views are shown of a personal vehicle, designated generally by numeral 10, in progressive stages of various tipping motions. An example of such a vehicle is the wheelchair-type vehicle described in U.S. Pat. No. 5,701,965 (Kamen et al.) issued Dec. 24, 1997, and incorporated herein by reference. The present invention is applicable to motorized personal or other vehicles, such as the vehicle described in the Kamen et al. patent, and to unmotorized personal vehicles as well.

Figure 1:
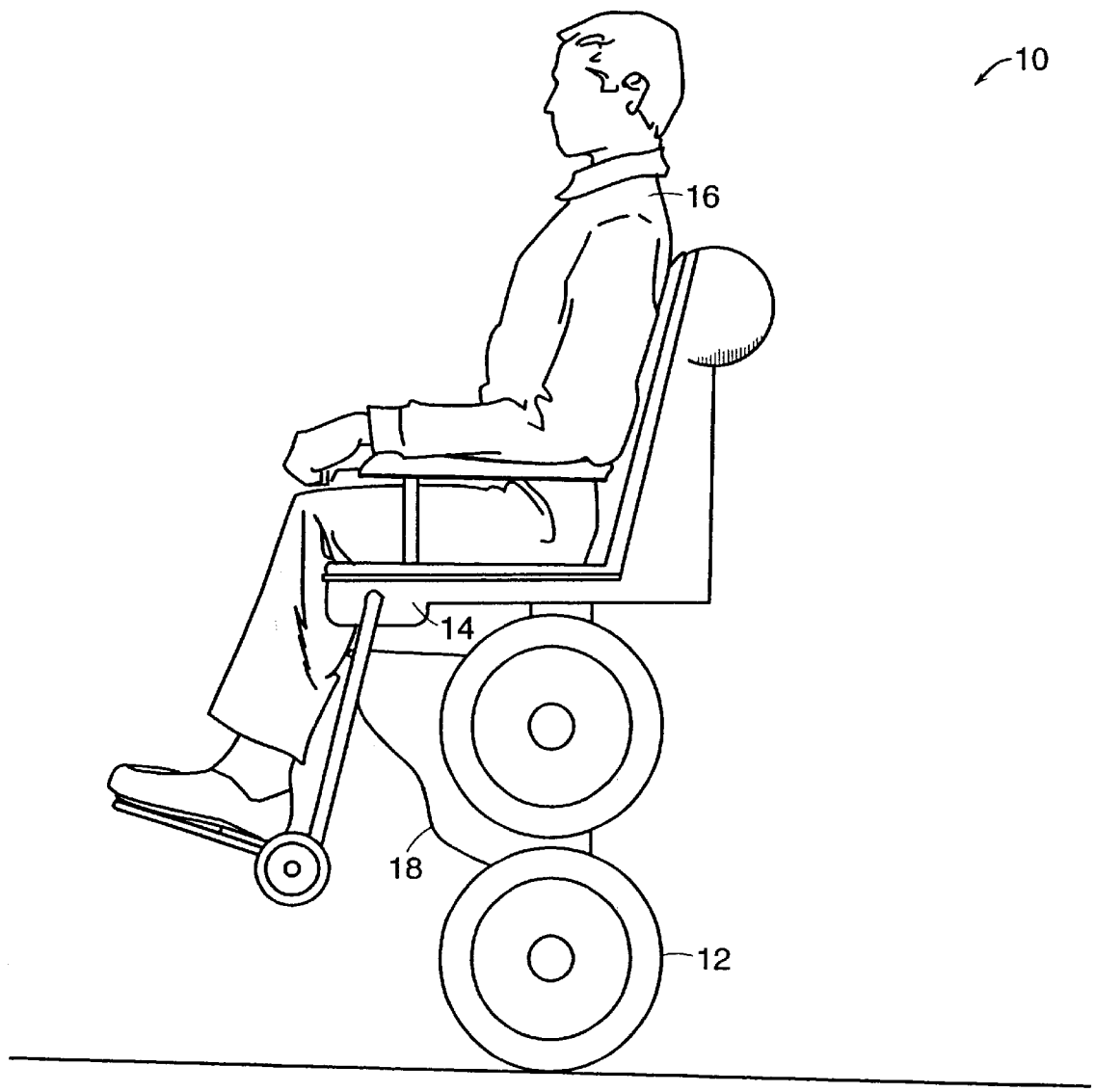
FIG. 1 is a side view of a prior art wheelchair-type vehicle of the type in which an embodiment of the invention may be advantageously employed.

Referring, particularly, to FIG. 1, vehicle 10 is shown, by way of example, as supported on a pair of laterally disposed wheels 12 (of which one is visible in FIG. 1) that provide ground contact for vehicle 10. While the invention will be described with reference to the wheelchair-type vehicle shown in FIG. 1, it is to be understood that vehicles with other configurations, bearing other numbers of wheels, and used for other purposes may similarly benefit from the safety mechanism which is the subject of the present invention.

Vehicle 10, broadly speaking, has two primary functional parts: a body support 14 which may be in the form of a seat or otherwise, for carrying a passenger 16, and a ground contacting assembly 18 which includes wheels 12 and bearing mechanisms and motor drives (not shown), if present, associated with the wheels. In conventional vehicles, and under ordinary circumstances of operation, body support 14 is coupled to ground contacting assembly 18 in a fixed manner, and passenger 16 is transported through locomotion across the ground of ground contacting assembly 18. The strategy employed by the present invention in case of mishap is to decouple passenger 16, along with body support 14, from being constrained to follow the motion defined by coupling of body support 14 to ground contacting assembly 18.

For purposes of this description and in any appended claims, the motion of one body will be said to be coupled to the motion of a second body when forced action on one of the bodies cause acceleration of the other body. If the bodies are fully coupled, then the motion of the center of mass of one of the bodies fully constrains the motion of the center of mass of the second body. The term "decoupling" describes any process whereby two or more bodies formerly coupled cease, after decoupling, to be coupled. "Separation," or full decoupling, is an instance of decoupling. Decoupling of motion between two bodies may be substantially full or may be limited to particular degrees of freedom.

Prior to a mishap, which may include an encounter with an obstacle, sudden turning resulting in instability, mechanical or electrical failure, or other event, passenger 16 is traveling with motion parallel to the ground, and in a desired body orientation, ordinarily seated. To avoid injury to the passenger, it is desirable to maintain this orientation, to the extent possible, independent of subsequent tumbling of the ground contacting assembly 18. Tumbling of the body support constitutes undesirable acceleration. In order to bring about the desired separation of the post-mishap inertial motion of the body support 14 from that of the ground contacting assembly, a physical decoupling of the body support from the ground contacting assembly is effected with respect to some or all degrees of freedom. The separation is 'passive' in the sense that the kinetic energy of the body support and passenger are used to effect the decoupling, or, alternatively, the separation may be powered or assisted by mechanical or other means. Examples of some methods of decoupling are discussed in the description which follows.

Figure 2:
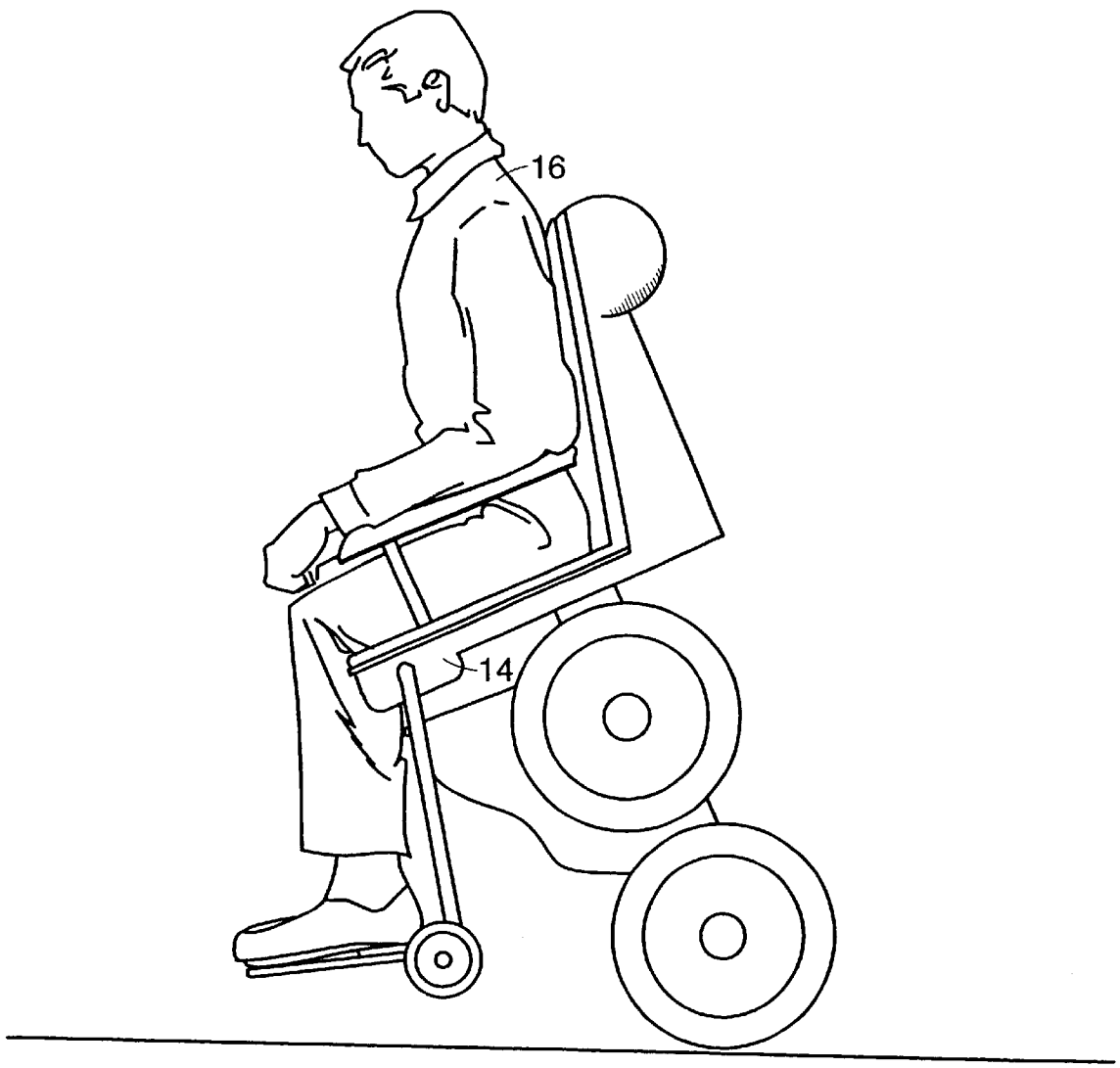
FIG. 2 is a side view of the wheelchair-type vehicle of FIG. 1 shown in an early stage of a forward tip.
Figure 3A:
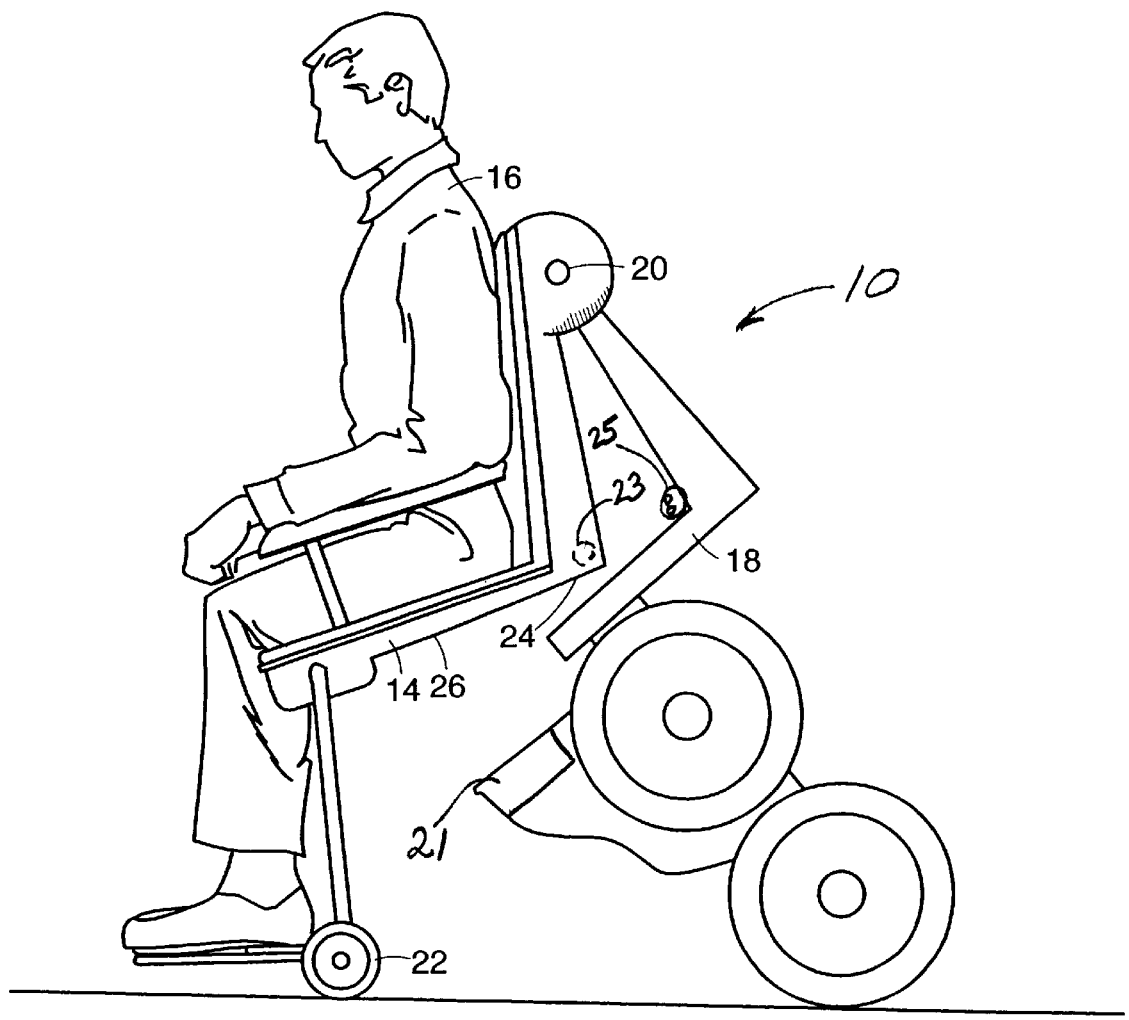
FIG. 3A is a side view of the wheelchair-type vehicle tipping as in FIG. 2 employing an embodiment of the current invention showing partial separation of the body support forward of the ground contacting assembly.
Figure 3B:
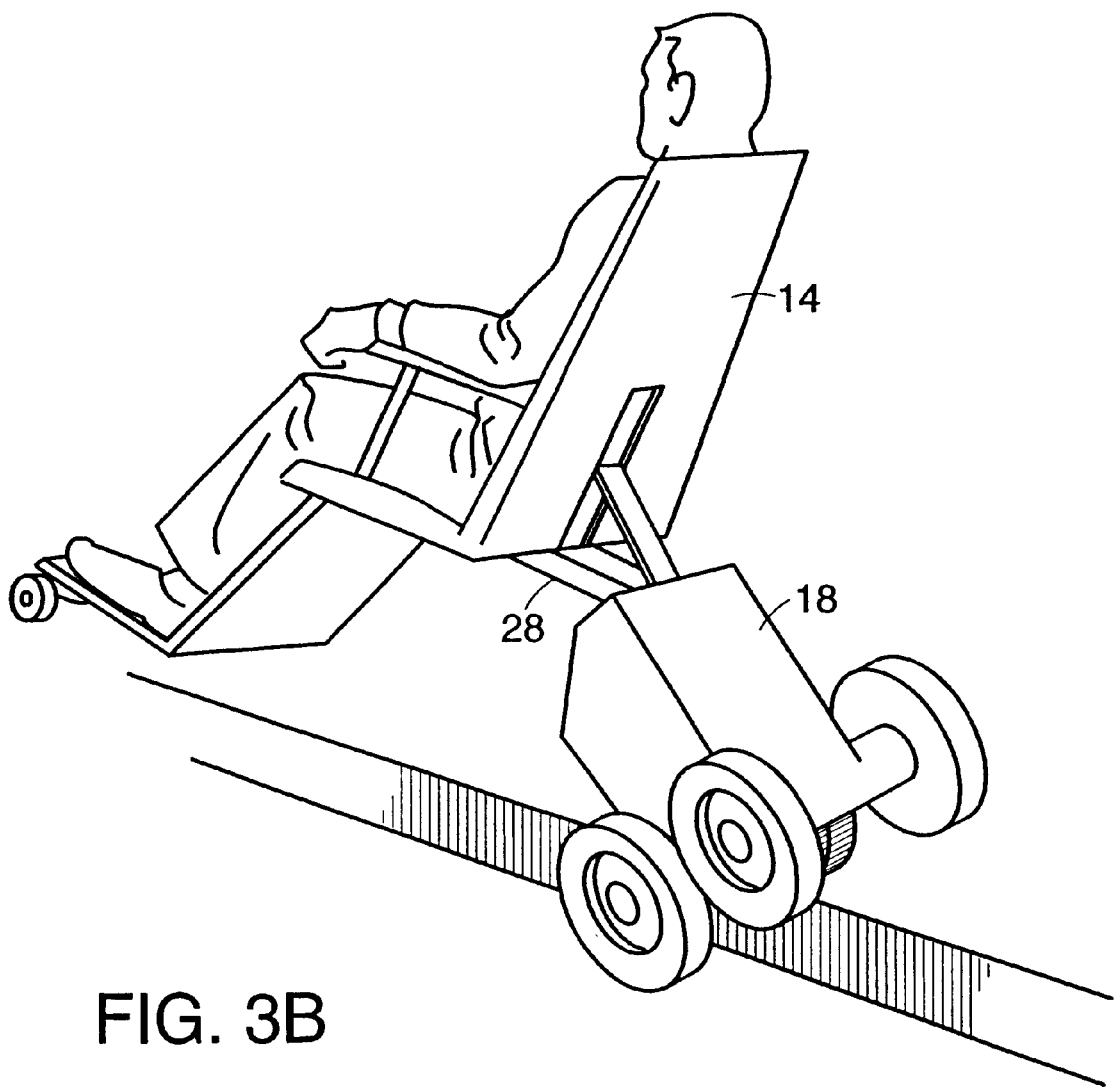
FIG. 3B is a perspective view from the side of a wheelchair-type vehicle employing an alternate embodiment of the current invention showing partial separation of the body support from the ground contacting assembly along a slide track.
Figure 20:
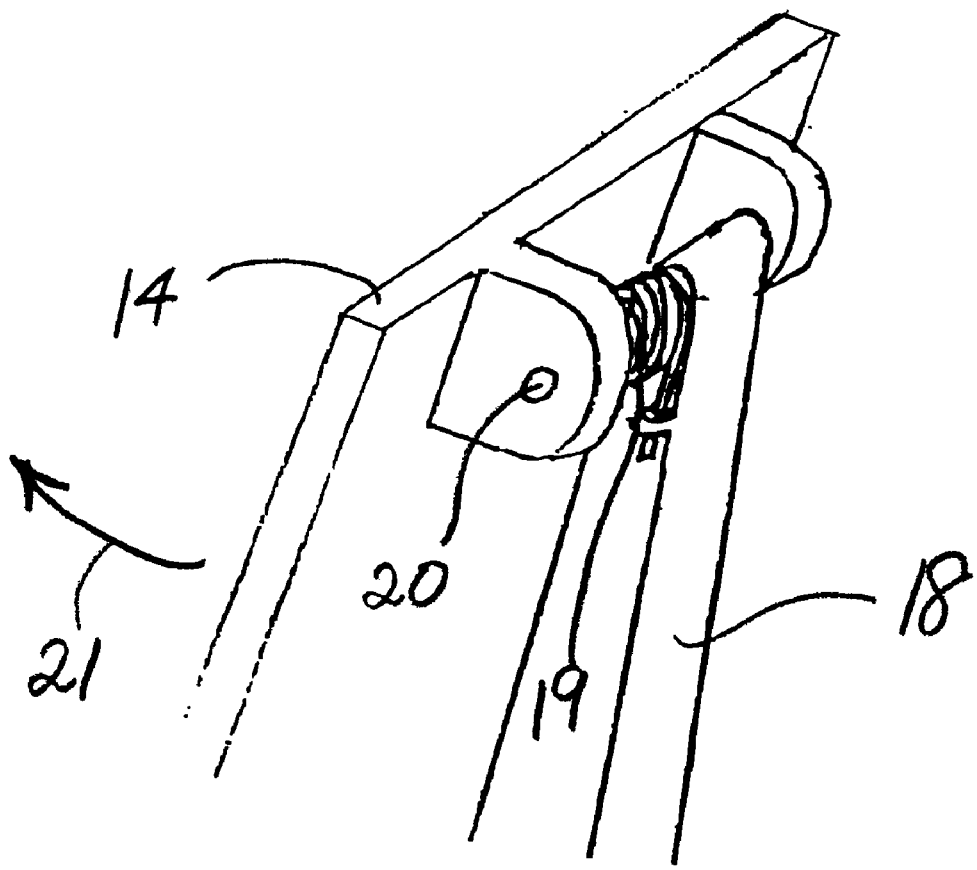
FIG. 20 is a perspective view of the pivotal coupling of a body support to a ground contacting assembly employing a torsion spring in accordance with an embodiment of the present invention.

Referring now to FIG. 2, a side view is shown of vehicle 10 in the initial stages of a tip, shown, in this case and by way of example, in a forward direction. Body support 14 is shown, again by way of example, as a chair-type configuration in which occupant 16 is seated, however other modalities of support are possible, and occupant 16 might be recumbent or in another position. FIGS. 2–6 represent a time-series of side views of vehicle 10 as it is tipping. Such a tip might arise due to a sudden turn or a mechanical failure of the system which ordinarily maintains vehicle 10 in an upright position, or due to an encounter with a surface irregularity or obstacle for which the vehicle and/or the driver is incapable of compensating. One of the embodiments of the present invention is shown in FIG. 3A, where vehicle 10 is shown in a further stage of a forward tip. In the depicted embodiment, body support 14 is coupled to ground contacting assembly via connector 20, which is shown, by way of example, as a pivot, located such that the inertial motion of body support 14 in a forward direction causes the body support and passenger 16 to swing clear of ground contacting assembly 18 after a mishap. A spring, such as a coil spring or other form of torsion spring configured about pivot 20 may be employed to assist the separation of body support 14 from ground contacting assembly 18. A detailed perspective view of the coupling of body support 14 to ground contacting assembly 18 at pivot 20 is depicted in FIG. 20. Under ordinary operating conditions, coiled torsion spring 19 applies a bias force on ground contacting assembly 18 resulting in a torque on body support 14 about pivot 20 in the angular sense designated by arrow 21.

A "release," as used in this description and in the claims hereto appended, refers to any mechanism for enabling the separation of body support 14 from ground contacting assembly 18. Many such mechanisms, such as a latch employing a locking mass displaced from a locking position upon inertial acceleration, are known to persons skilled in the mechanical arts. In accordance with a preferred embodiment of the invention, a catch 23 mounted to body support 14 and a base 25 coupled to ground contacting assembly 18, as shown in FIG. 3A, together comprise release 200, which is described below with reference to FIGS. 21A–21D.

In accordance with preferred embodiments of the invention, electronic sensors within electronics module 21 are used to automatically unleash the release which assists in the decoupling of the body support 14 from ground contacting assembly 18, after an initial tip is sensed. Tiltometers or accelerometers, for example, serve as sensors to provide the requisite information regarding tipping of transporter 10. In addition to assisting the separation of body support 14 from ground contacting assembly 18, spring 19 (shown in FIG. 20) coupled between body support 14 and ground contacting assembly 18 serves, once expanded, as a damper to absorb the kinetic energy of the body support 14 thereby cushioning the effect of the mishap on passenger 16 and vehicle. A "damper," as used herein and in any appended claims, refers generally to any device that eliminates or progressively diminishes motion, and, in doing so, converts kinetic energy to another form of energy. Many forms of dampers are known in the mechanical arts, such as all forms of shock absorbers, for example, and all such dampers are within the scope of the present invention.

Pivot 20 is shown as an example of many mechanisms whereby body support 14 may be coupled to ground contacting assembly 18 so as to permit subsequent decoupling of motion in the event of mishap. It is to be noted that decoupling subject to constrained pivotal motion about pivot 20 constitutes an example of partial decoupling. In other embodiments of the invention, identical relative motion of body support 14 with respect to ground contacting assembly 18 as that shown in FIG. 3A is achieved by coupling a point 24 on bottom surface 26 of body support 14 to a slide mechanism 28 (shown in FIG. 3B). Such an embodiment is described with reference to FIG. 3B wherein body support 14 separates from ground contacting assembly 18 by riding on slide mechanism 28 which constrains the motion of body support 14 along at least one axis. By virtue of this arrangement, body support 14 can be said to be virtually pivoted about a point above the respective centers of mass of both body support 14 and ground contacting assembly 18. The slide mechanism constrains body support 14 to move in a forward direction, with reference to the driver, and may be realized by means of a slide, or a rodless pneumatic cylinder 29, or in other ways, as are known to persons skilled in the mechanical arts. A pneumatic cylinder is an actuator or damper that interconverts the enthalpy of a gas and mechanical work. The workings of a pneumatic cylinder are summarized in Fraser & Milne, *Electromechanical Engineering: An Introduction*, IEEE Press, New York (1994), at pp. 178–182, which pages are appended hereto and incorporated herein by reference.

In an alternate embodiment, the mechanism providing coupling between body support 14 and ground contacting assembly 18 is a universal joint, thereby decoupling the motions of body support 14 and ground contacting assembly 18 after a mishap to operate, as well, when the unintended acceleration of ground contacting assembly 18 is in a sideward direction. Such an arrangement prevents torques from being transmitted from the surroundings to the body support 14.

Referring, again, to FIGS. 3A–3B, it is apparent that operation of the mechanism separating the motions of body support 14 and ground contacting assembly 18 after a mishap permits passenger 16 to remain substantially in a proper orientation, with head up and legs down, and avoids entrapment of passenger 16 with ground contacting assembly 18. In a preferred embodiment of the invention, body support 14 is provided with one or more pilot wheels 22 to allow continued forward motion of body support 14 and to prevent tipping about a fixed point in contact with the ground. A self-leveling mechanism, as typically employed in the suspension system of the front end of an automobile, for example, may be employed, as well known in the vehicle arts, to allow laterally disposed pilot wheels 22 to contact the ground simultaneously, even when the underlying surface is uneven.

Figure 21A:
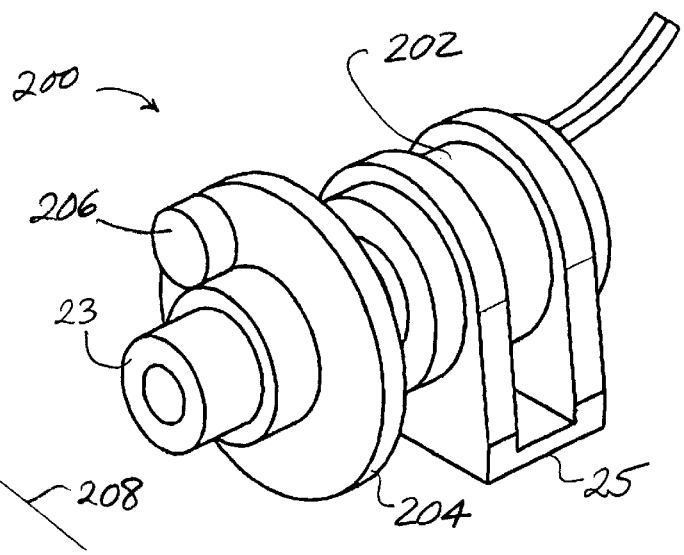
FIG. 21A is a perspective view of a release mechanism for decoupling the body support of a personal transporter vehicle from the ground contacting assembly of the vehicle, in accordance with an embodiment of the invention.

An embodiment of a release mechanism 200 is now described with reference to FIGS. 21A–21D. FIG. 21A shows a perspective view of the release mechanism in its coupled (or 'engaged') condition. The condition shown in FIG. 21A is also referred to herein as the 'latched' condition of the release mechanism. Catch 23 is coupled to body support 14 whereas base 25 is mounted to ground contacting assembly 18, as shown in FIG. 3A. Base 25 includes an actuator such as electric motor 202. Motor 202, when actuated, rotates wheel 204. In the latched condition, rollers 206 prevent catch 23 from moving in the forward direction 208 and body support 14 thus remains coupled at its base to the ground contacting assembly. An end view of wheel 204 with rollers 206 retaining catch 23 in the latched position is shown in FIG. 21C.

Figure 21B:
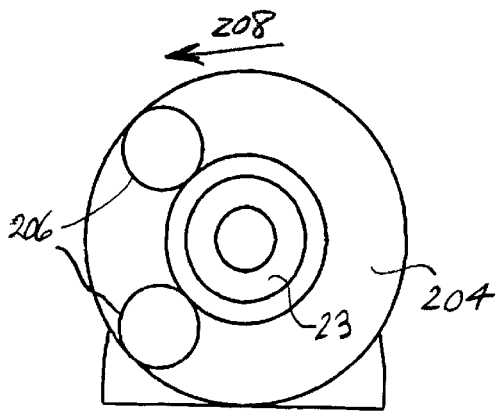
FIGS. 21B–21D are end views of the release mechanism of FIG. 21A in successive stages of activation of the release.
Figure 21C:
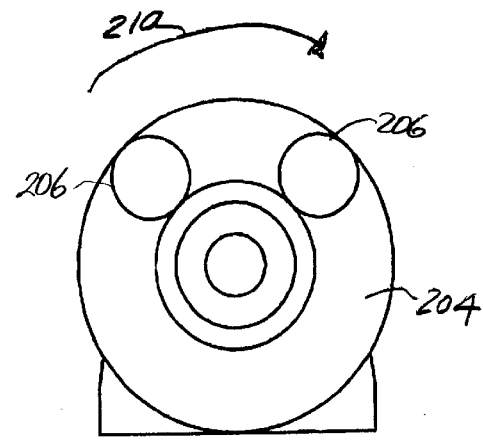
Figure 21D:
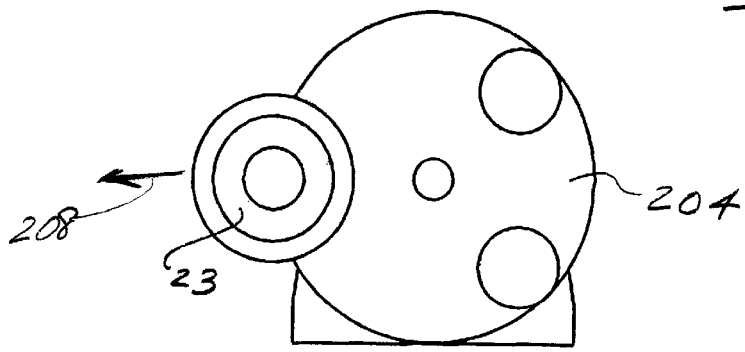

Referring now to FIG. 21B, activation of motor 202 in response to a sensed tipping of the vehicle causes rotation of wheel 204 in direction 210. Rollers 206 rotate with the wheel. Once wheel 204 has been rotated sufficiently, as shown in FIG. 21D, catch 23 is no longer retained by rollers 206 and is free to move forward in direction 208, thereby allowing body support 14 to pivot about pivot 20, as shown in FIG. 3A.

It is to be understood that other actuators may be employed, within the scope of the invention, other than motor 202, shown by way of example and without limitation. A rotary actuator such as motor 202, has an advantage in that substantially no torque is required in order to release catch 23 from its latched position. The actuator employed may also be a solenoid or, alternatively, may be a pneumatic or hydraulic cylinder.

Figure 4:
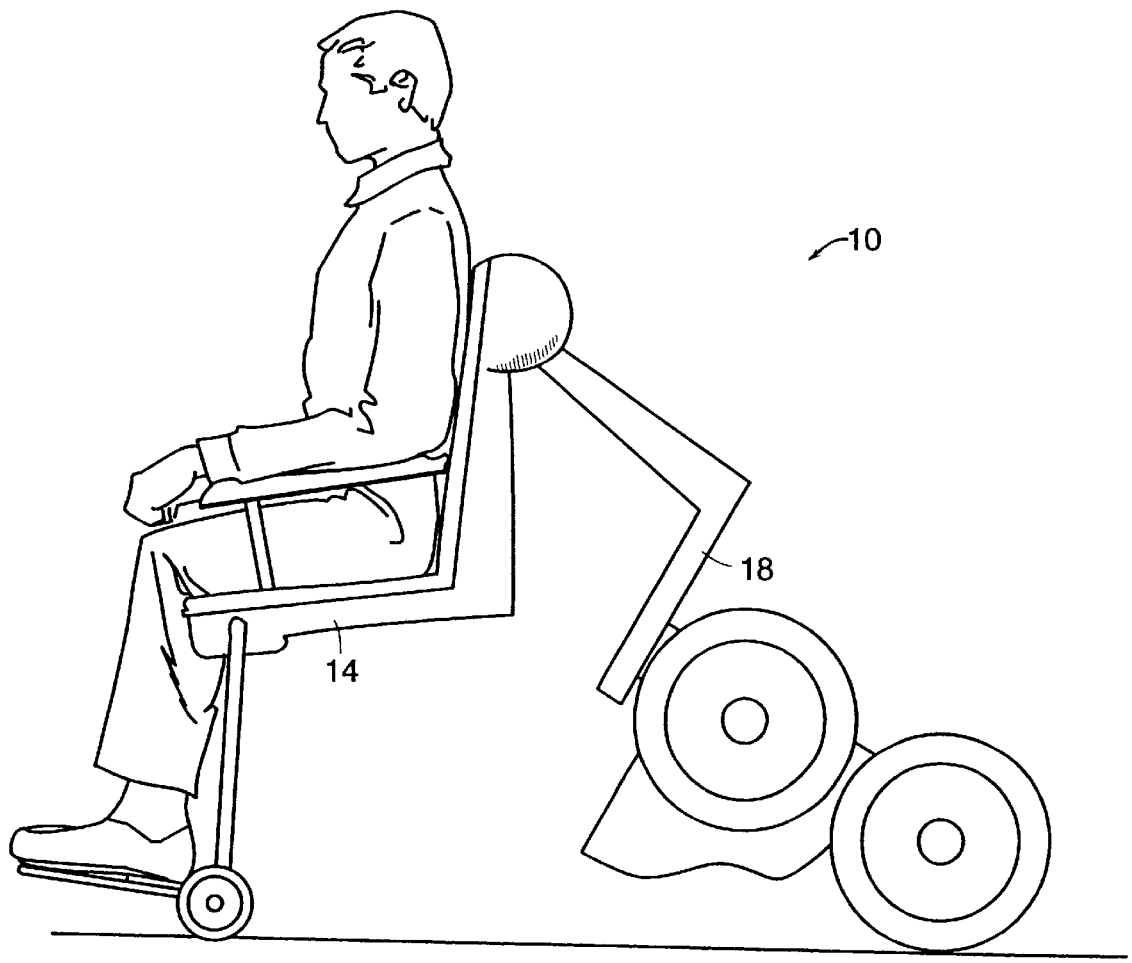
FIG. 4 is a side view of the wheelchair-type vehicle tipping as in FIG. 2 employing an embodiment of the current invention showing a further stage of separation of the body support forward of the ground contacting assembly.
Figure 5:
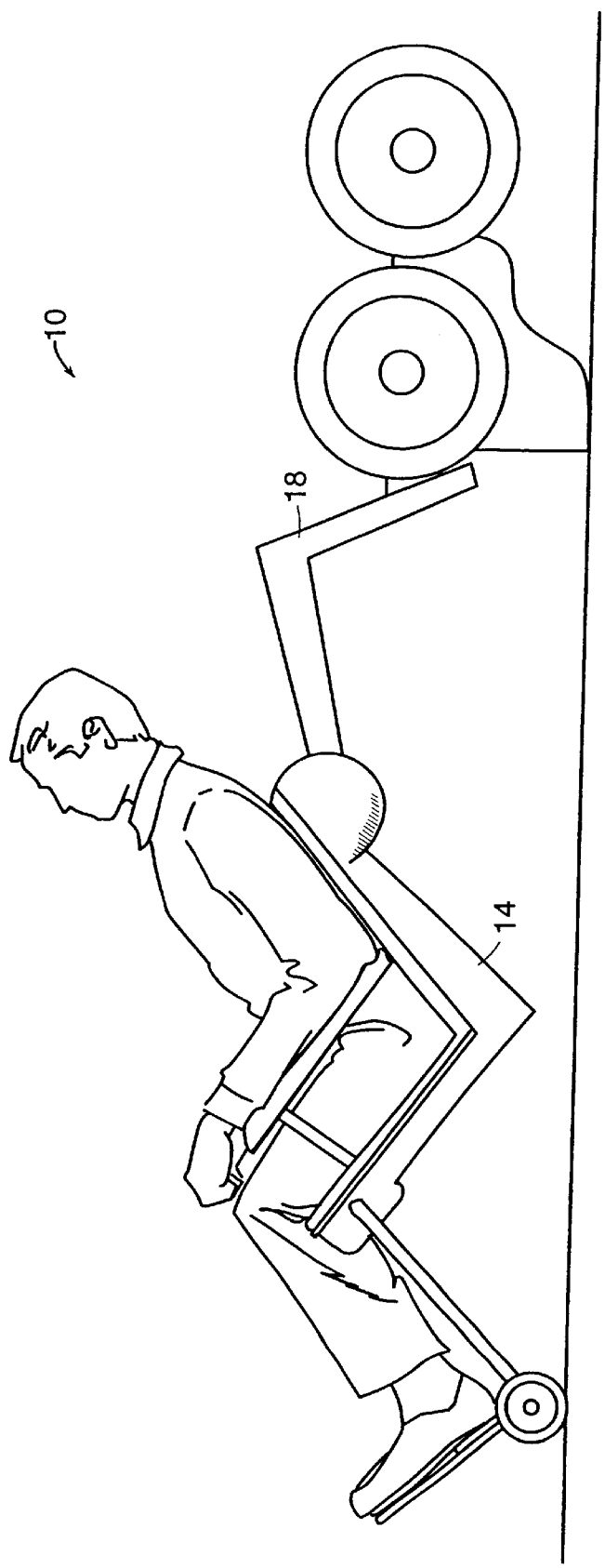
FIG. 5 is a side view of the wheelchair-type vehicle tipping as in FIG. 2 employing an embodiment of the current invention showing a final stage of separation of the body support forward of the ground contacting assembly.
Figure 6:
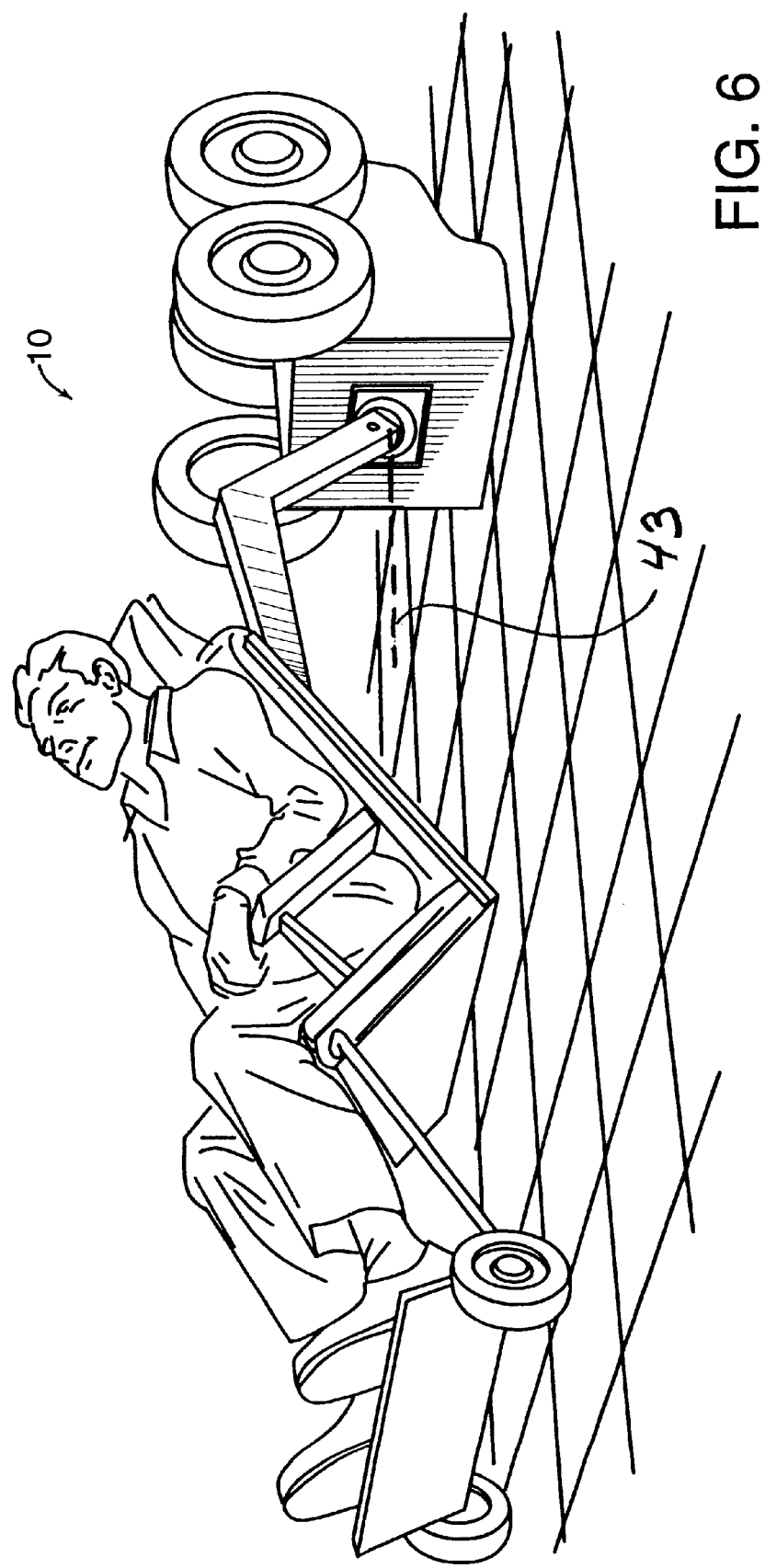
FIG. 6 is a perspective view of the wheelchair-type vehicle tipping as in FIG. 2 employing an embodiment of the current invention showing a final stage of separation of the body support forward of the ground contacting assembly.

FIG. 4 shows vehicle 10 in a subsequent stage of separation of body support 14 from ground contacting assembly 18, while FIG. 5 shows vehicle 10 after ground contact assembly 18 has fully overturned, while passenger 16 remains protected by body support 14 and in a substantially upright position. FIG. 6 is a perspective view of vehicle 10 in the same state of repose as depicted from the side in FIG. 5.

Figure 7:
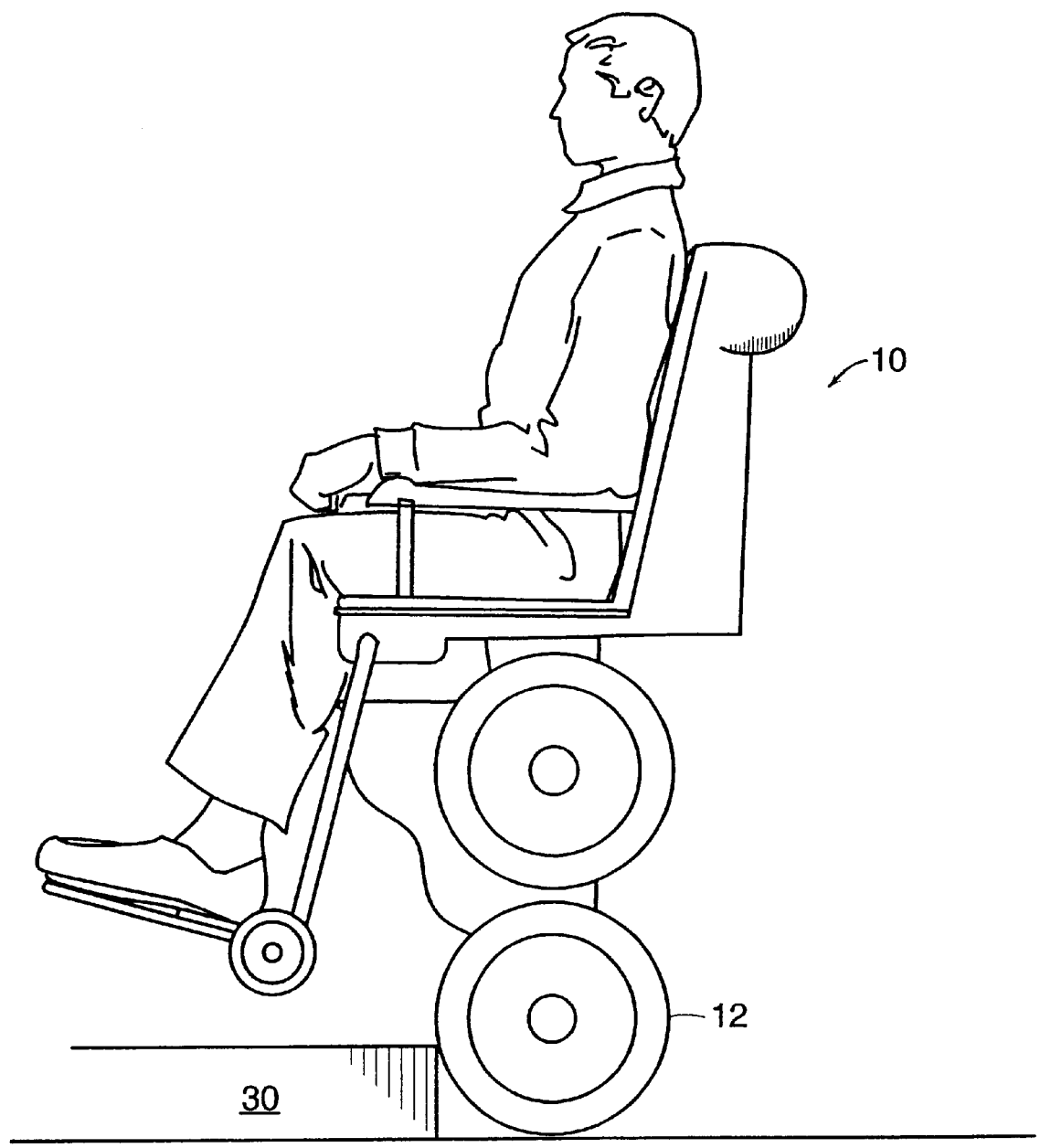
FIG. 7 is a side view of the wheelchair-type vehicle of FIG. 1 shown at an instant at which a ground obstacle is encountered.
Figure 8:
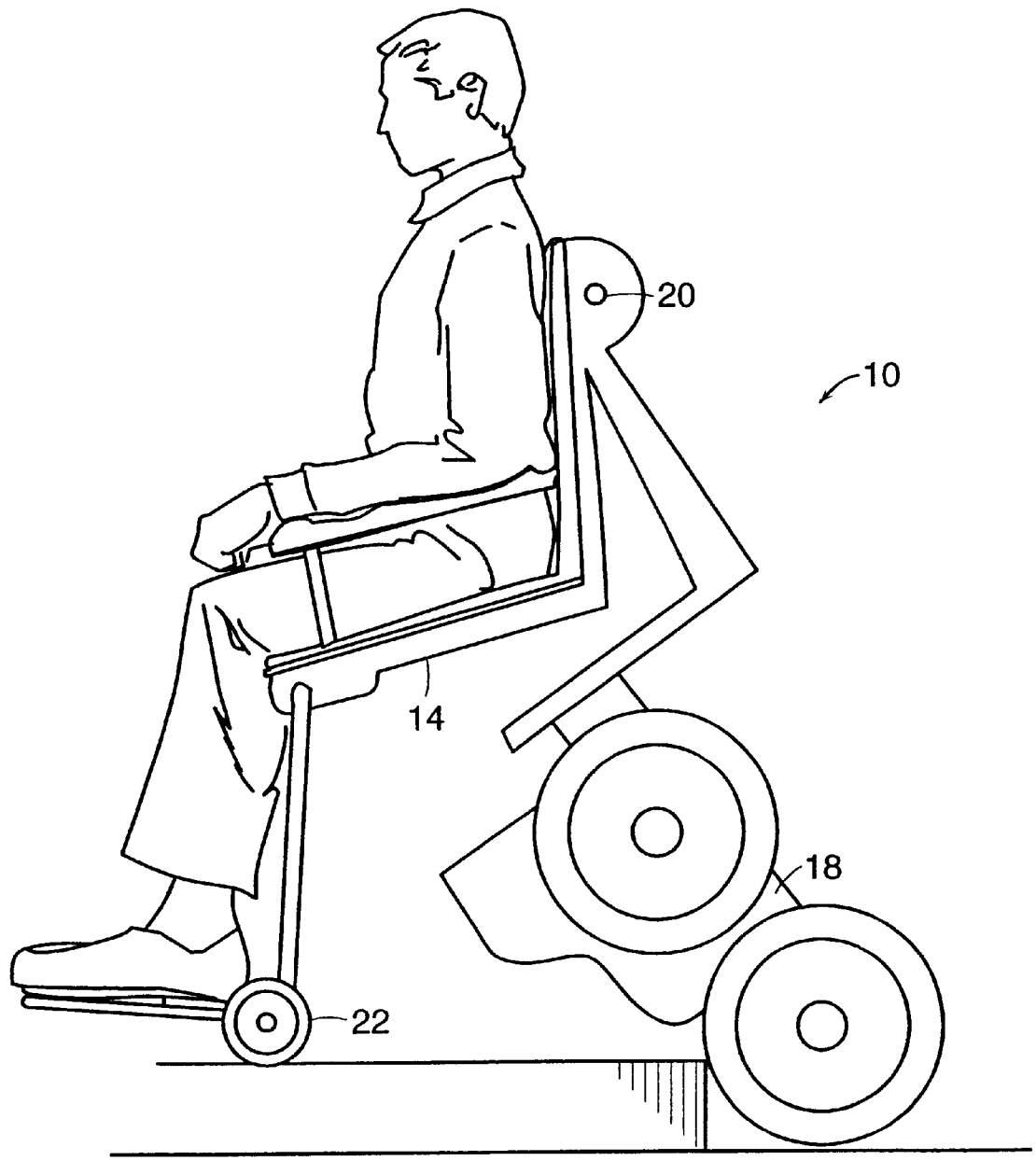
FIG. 8 is a side view of the wheelchair-type vehicle tipping as in FIG. 7 employing an embodiment of the current invention showing partial separation of the body support forward of the ground contacting assembly.
Figure 9:
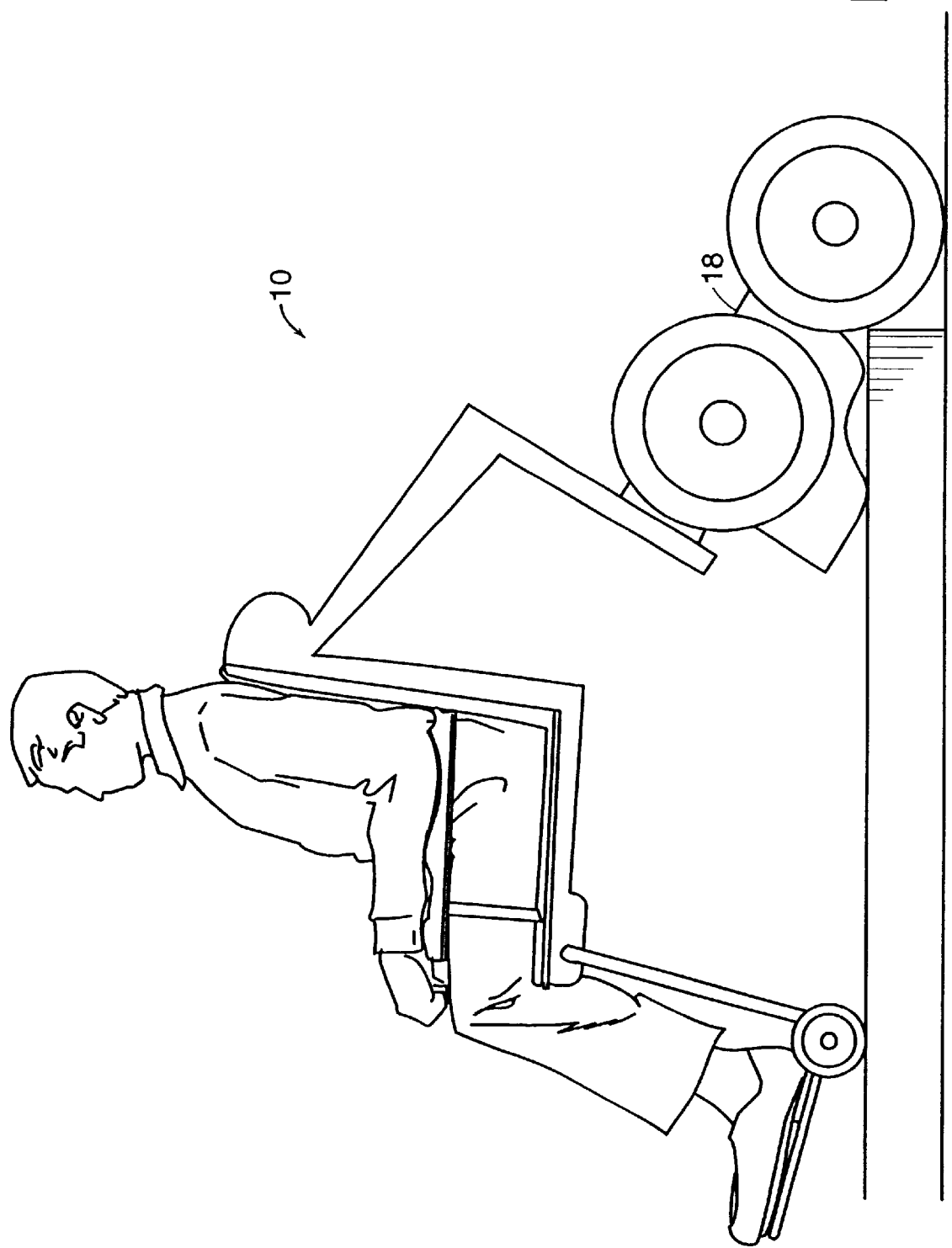
FIG. 9 is a side view of the wheelchair-type vehicle tipping as in FIG. 7 employing an embodiment of the current invention showing a further stage of separation of the body support forward of the ground contacting assembly.
Figure 10:
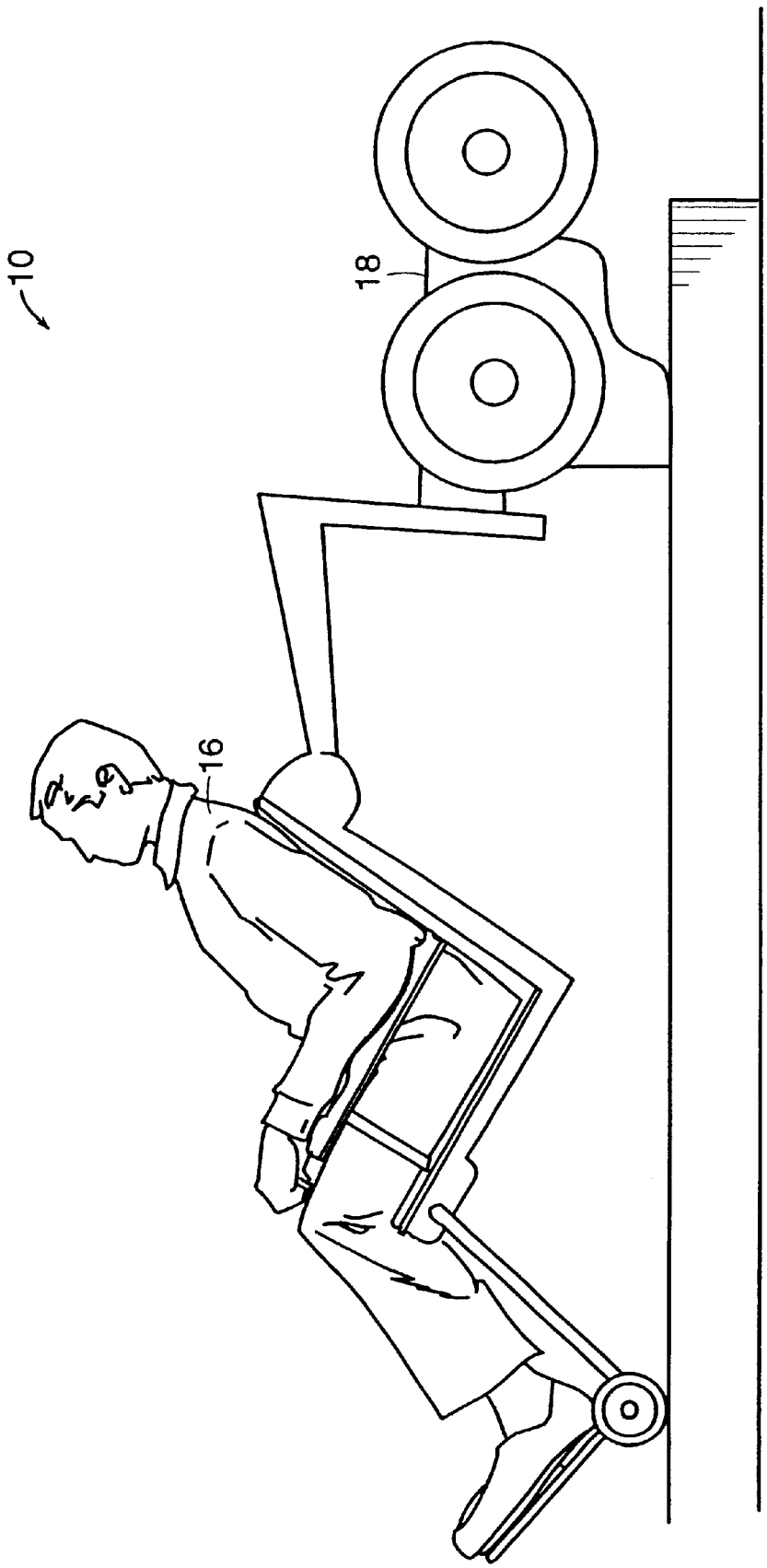
FIG. 10 is a side view of the wheelchair-type vehicle tipping as in FIG. 7 employing an embodiment of the current invention showing a final stage of separation of the body support forward of the ground contacting assembly.

Referring now to FIG. 7, vehicle 10 is shown in an upright orientation associated with ordinary locomotion, at an instant at which wheel 12 encounters a ground obstacle 30. While vehicle might be designed to overcome the obstacle, in the event of the incapacity of the vehicle to overcome the obstacle, the response of an embodiment of the present invention will be described with reference to FIGS. 8–10. Referring, more particularly, to FIG. 8, by way of example, vehicle 10 is shown in an early stage of separation of body support 14 from ground contacting assembly 18 by means of opening about pivot 20. Pilot wheel 22 is shown having made contact with ground obstacle 30 to provide support against tipping for body support 14. A later stage of separation of body support 14 from ground contacting assembly 18 is shown in FIG. 9, while FIG. 10 shows ground contacting assembly 18 fully tipped, while passenger 16 remains in a substantially upright and protected position by virtue of the operation of the invention to separate the motion of body support 14 from that of ground contacting assembly 18.

Figure 11:
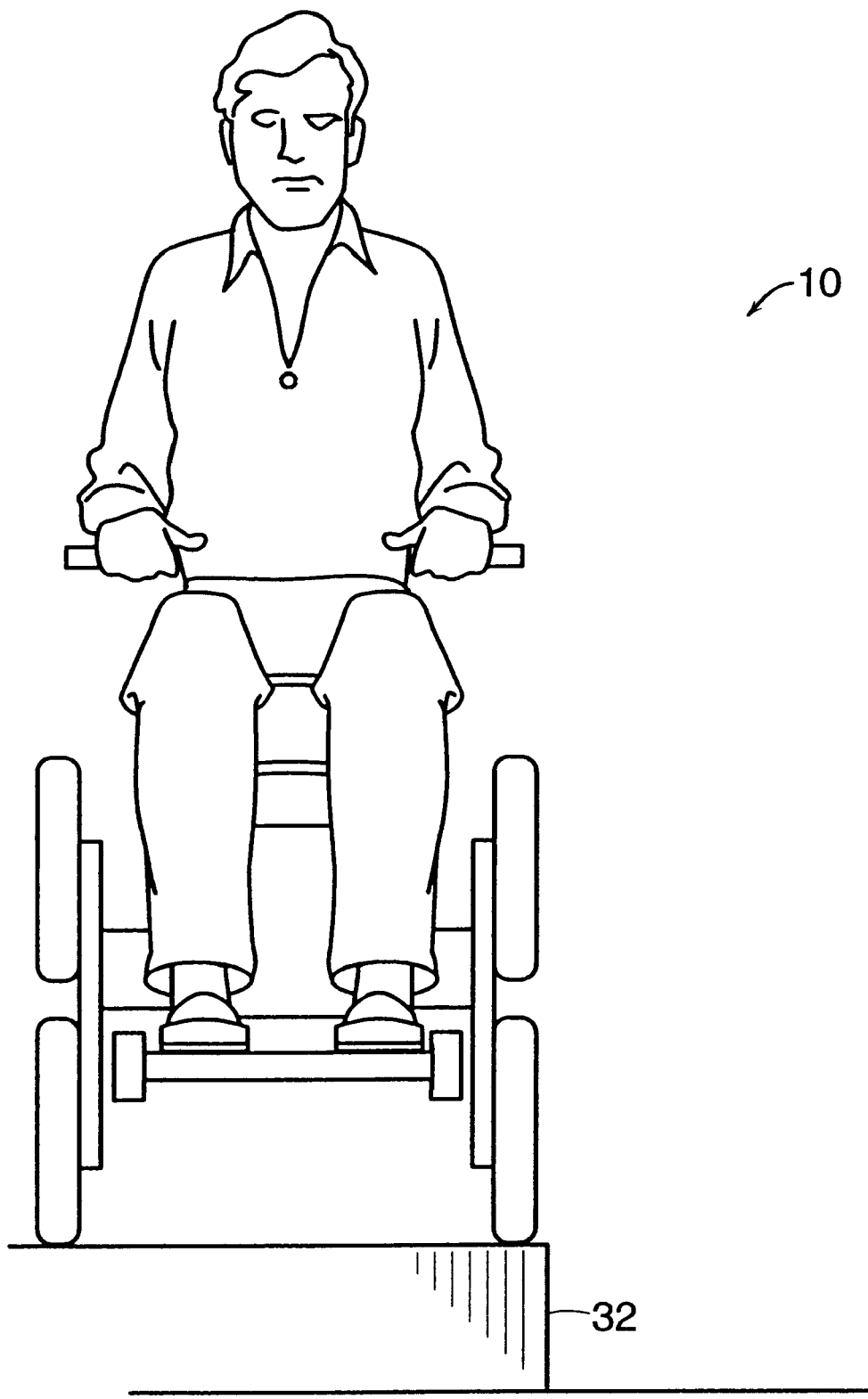
FIG. 11 is a front view of the vehicle of FIG. 1, shown approaching a step or curb.
Figure 12:
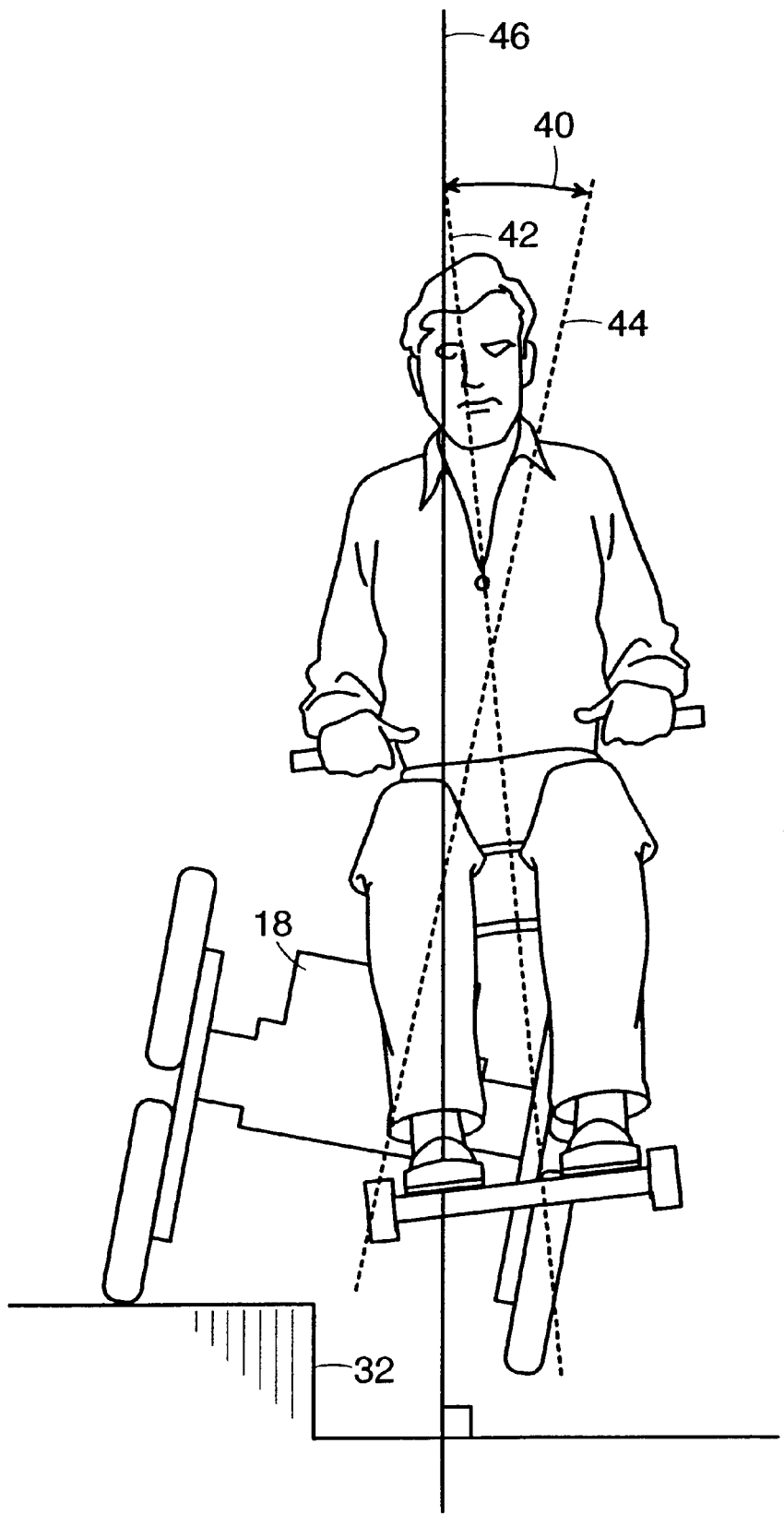
FIG. 12 is a front view of the wheelchair-type vehicle tipping as in FIG. 11 employing an embodiment of the current invention showing partial separation of the body support sideward of the ground contacting assembly.
Figure 13:
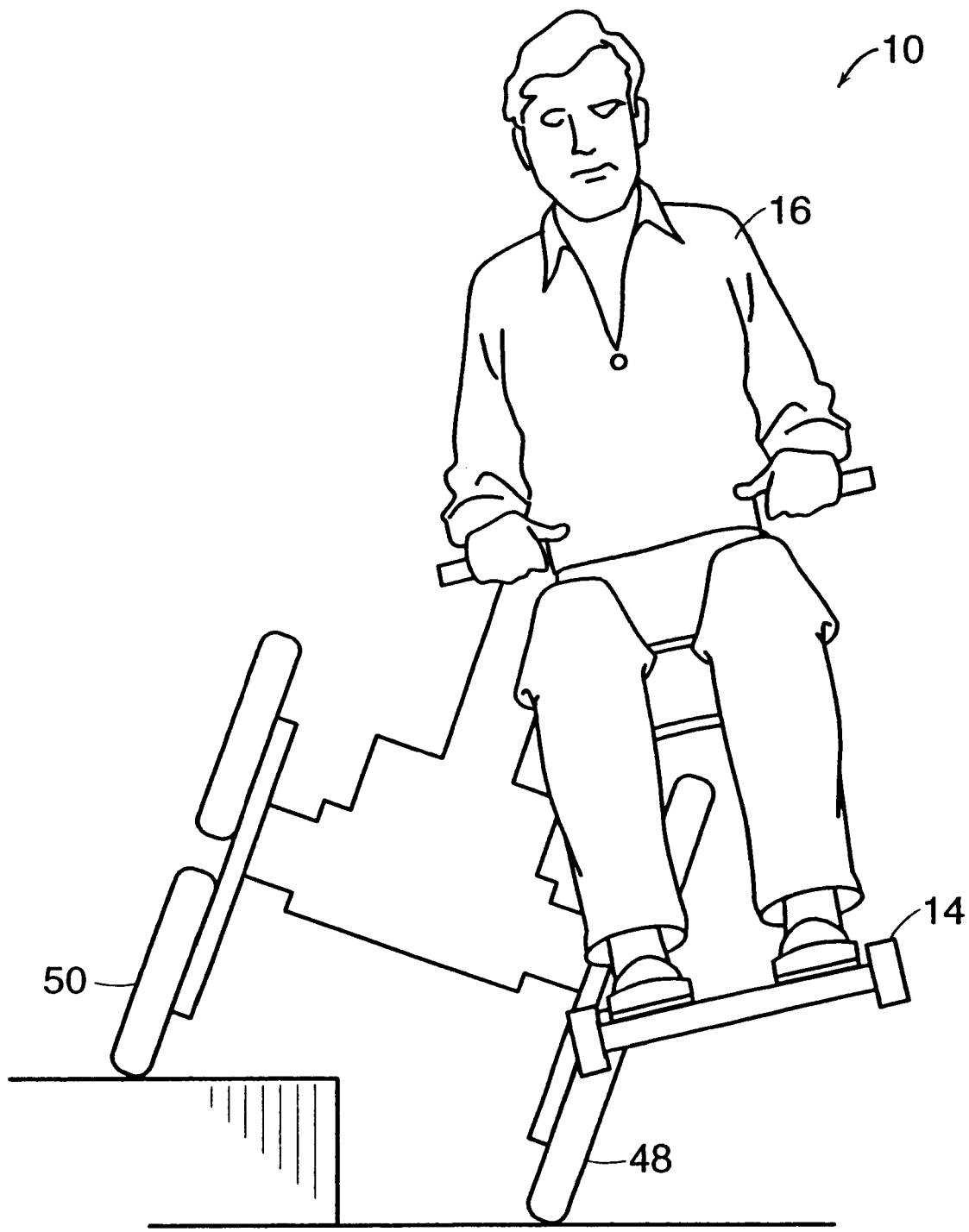
FIG. 13 is a front view of the wheelchair-type vehicle tipping as in FIG. 11 employing an embodiment of the current invention showing a further stage of separation of the body support sideward of the ground contacting assembly.
Figure 14:
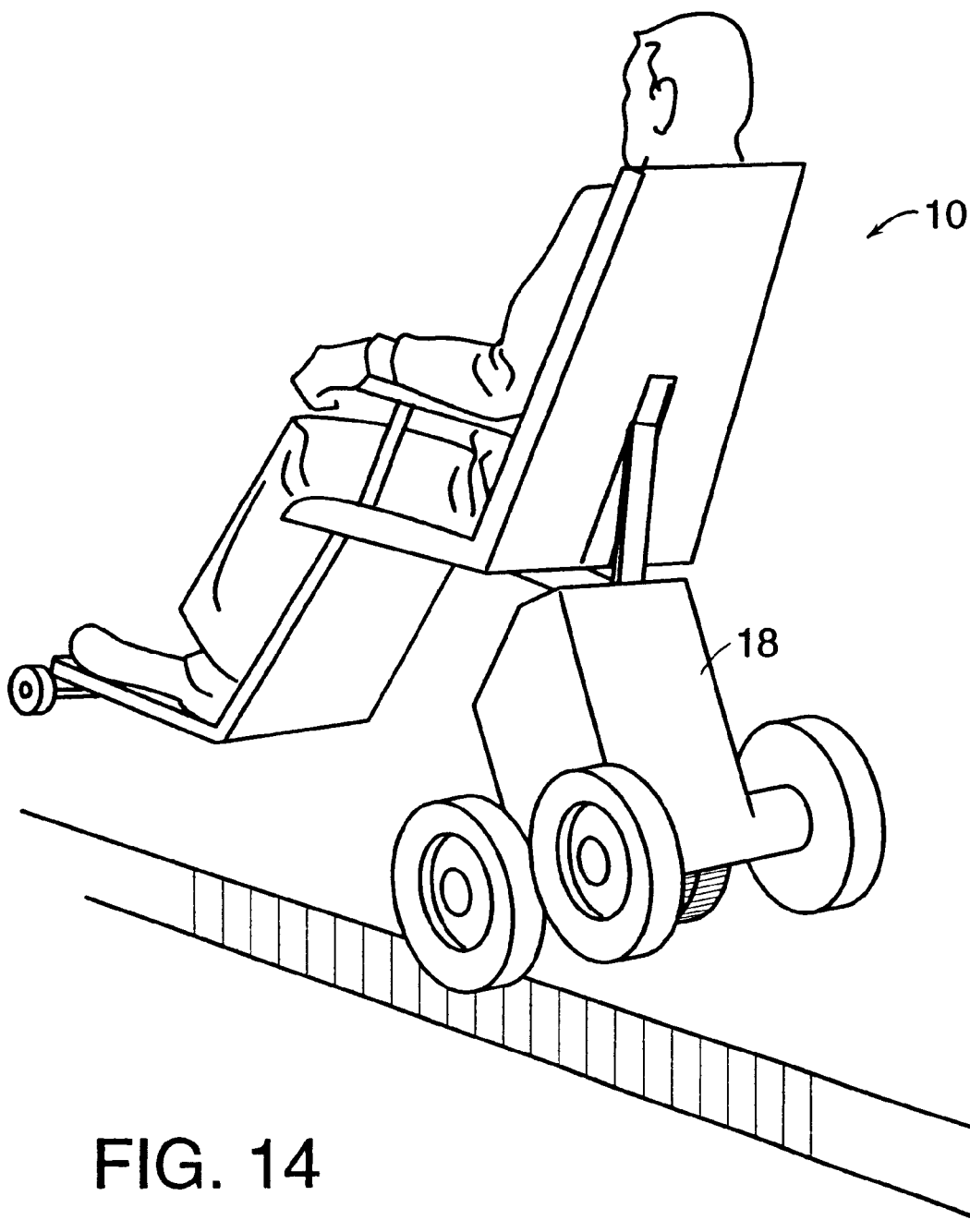
FIG. 14 is a perspective view of the wheelchair-type vehicle employing an embodiment of the current invention in the intermediate stage of a sideward tip of FIG. 13.

Referring now to FIGS. 11–15, in which vehicle 10 is shown responding to a sideward tip in accordance with the invention. Referring more particularly to FIG. 11, vehicle 10 is shown approaching a lateral surface irregularity 32 which may be a curb or a step, for example. FIG. 12 shows ground contacting assembly 18 in an early stage of lateral tipping due to surface irregularity 32. The term "roll angle" 40 as used in this description and in the appended claims is defined to refer to the angle between the vertical axis of passenger 16 (i.e., a line parallel to the spine of the passenger) and an axis 44 parallel to a plane containing a wheel 12 of ground contacting assembly 18. Roll angle 40 may be corrected, in accordance with a preferred embodiment of the invention, by allowing free or mechanically driven rotation of body support 14 about an axis perpendicular to axes 42 and 44. Equivalently, roll angle 40 may be corrected to maintain passenger 16 in a substantially upright position by other combinations of motion known to persons skilled in the mechanical arts, such as by means of a driven swivel of body assembly 14 about axis 42 parallel to the spine of passenger 16 coupled with translation of the point of contact between body assembly 14 and the plane of ground contacting assembly 18 which is perpendicular to axis 44. In a preferred embodiment of the invention, the swivel of body assembly 14 with respect to axis 42 is driven by a motor or other actuator (not shown) which is part of a control loop in which the torque applied about axis 43 (shown in FIG. 6) is governed by a controller on the basis of the sensed deviation of axis 42 from the true vertical axis FIG. 13 shows vehicle 10 in a further stage of lateral tipping, with wheels 48 and 50 in contact with the underlying surface at different vertical levels, and with the position of body support 14 and passenger 16 corrected in accordance with an embodiment of the invention, as described above. FIG. 14 is a perspective view of vehicle 10 in the later tip of ground contacting assembly 18 shown in FIG. 13.

Figure 15A:
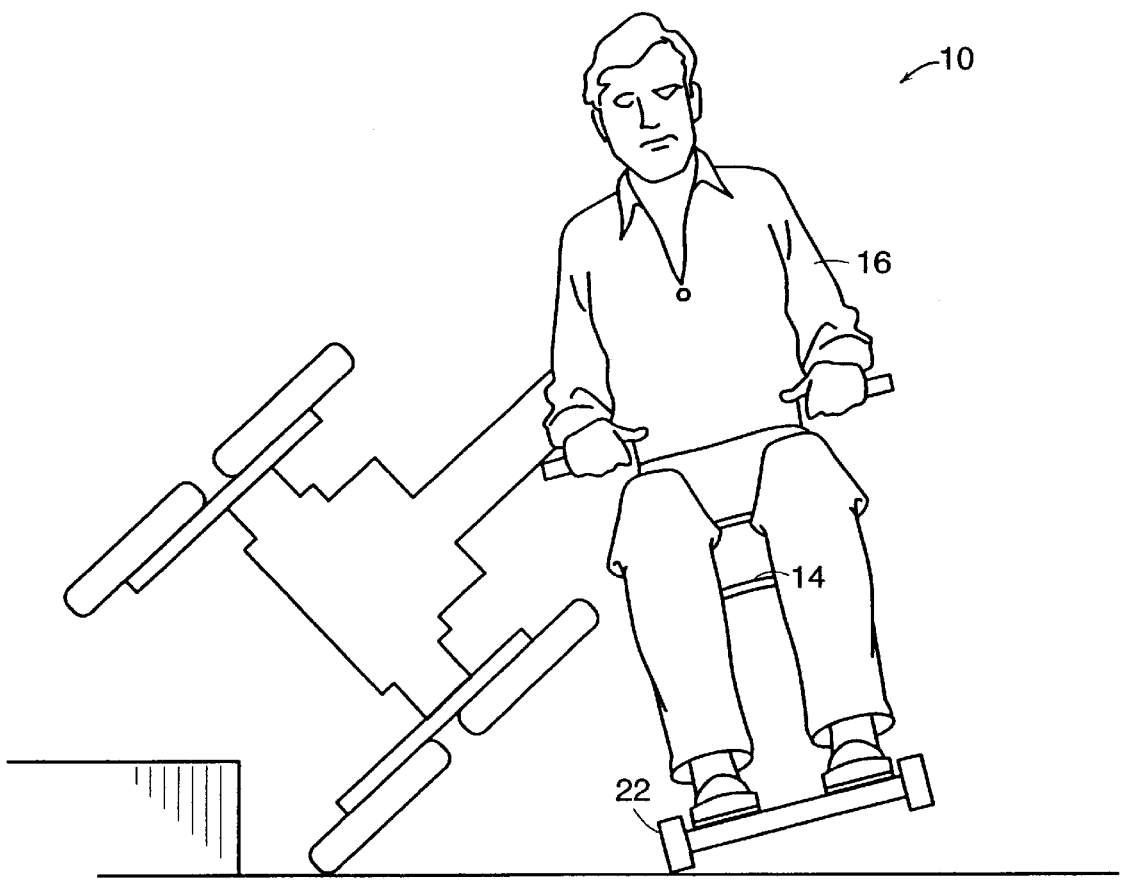
FIG. 15A is a front view of the wheelchair-type vehicle tipping as in FIG. 11 employing an embodiment of the current invention showing ground contact of a pilot wheel.
Figure 15B:
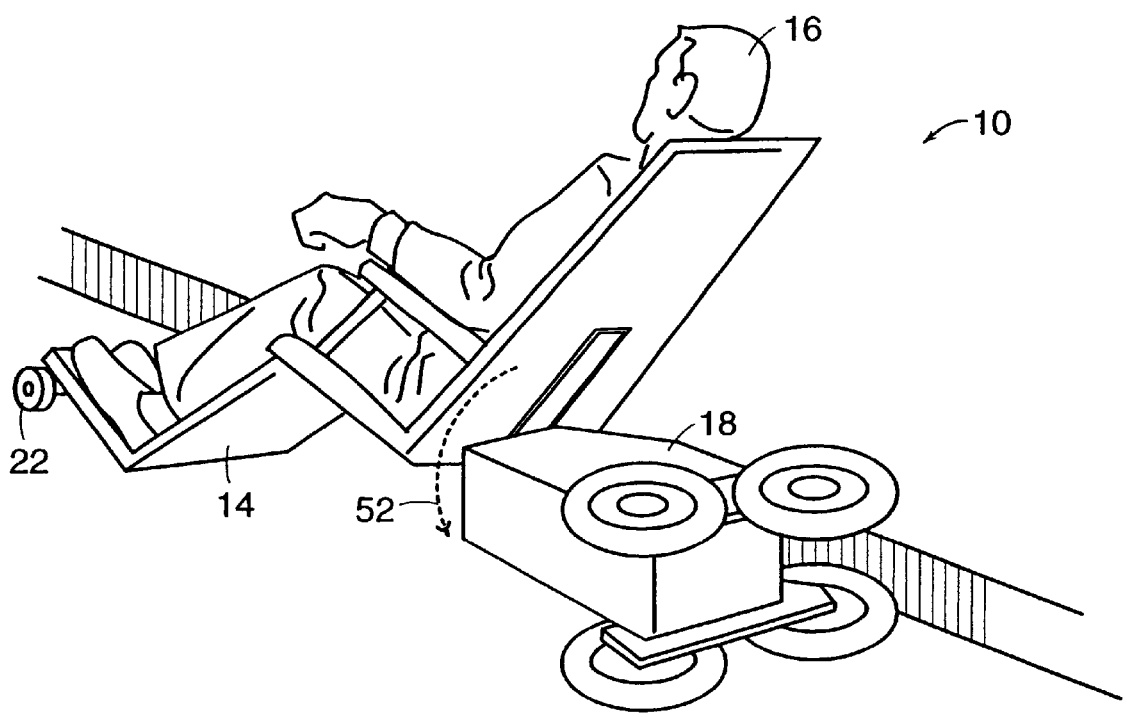
FIG. 15B is a perspective view of the wheelchair-type vehicle employing an embodiment of the current invention in the stage of a sideward tip of FIG. 15A.

FIG. 15A shows a side view of vehicle 10 in a later stage of a lateral tip, where pilot wheel 22 has contacted the ground to provide support against tipping for body support 14. FIG. 15B shows a perspective view of vehicle 10 in a final state of repose after the sideward tip of FIG. 15A. While ground contacting assembly 18 has rotated along path 52, the inertia of body support 14 has maintained passenger 16 in an upright and protected position, and at rest, with pilot wheel 22 supporting body support 14 on the ground. In an alternate embodiment, body support 14 may have a plurality of pilot wheels 22 or casters, with a mechanical, hydraulic, or other interconnecting link to provide for force-leveling or self-leveling so that after a mishap, body support 14 may be supported on a plurality of pilot wheels 22, even when the ground surface is uneven.

Figure 16:
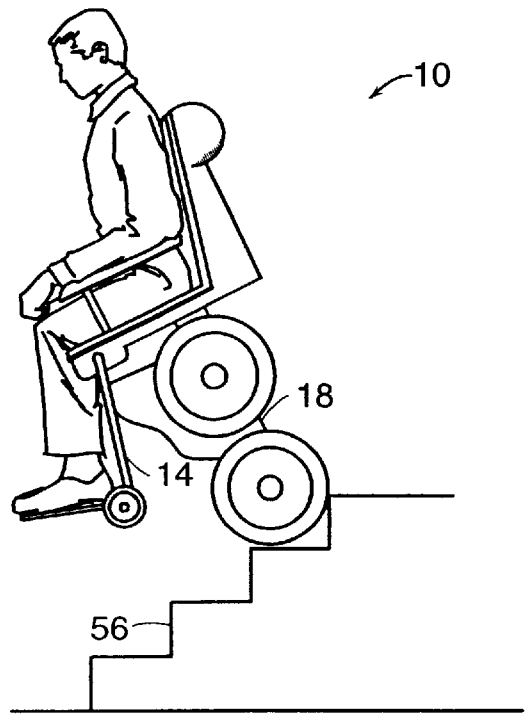
FIG. 16 is a side view of the wheelchair-type vehicle of FIG. 1 shown in an early stage of a forward fall down a flight of stairs.
Figure 17:
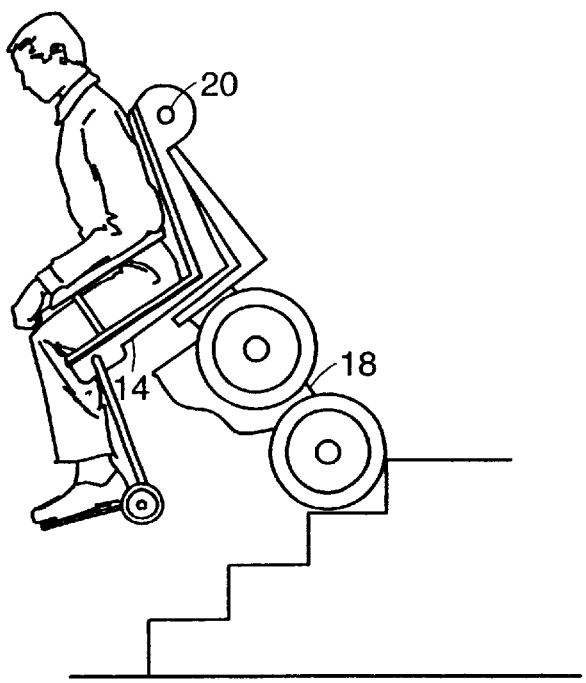
FIG. 17 is a side view of the wheelchair-type vehicle tipping as in FIG. 16 employing an embodiment of the current invention showing partial separation of the body support forward of the ground contacting assembly.
Figure 18:
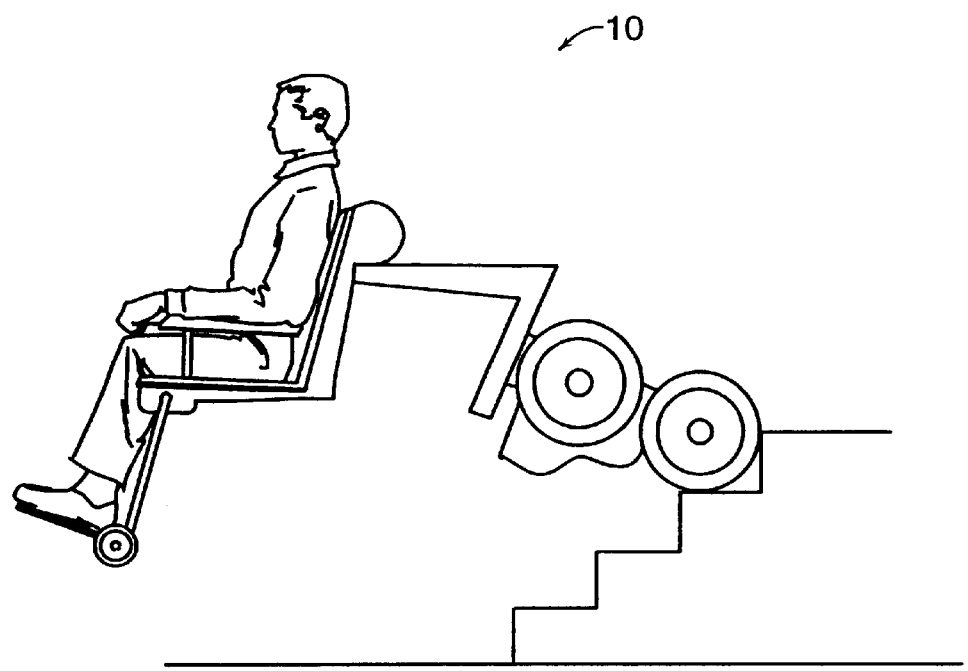
FIG. 18 is a side view of the wheelchair-type vehicle tipping as in FIG. 16 employing an embodiment of the current invention showing a further stage of separation of the body support forward of the ground contacting assembly.
Figure 19:
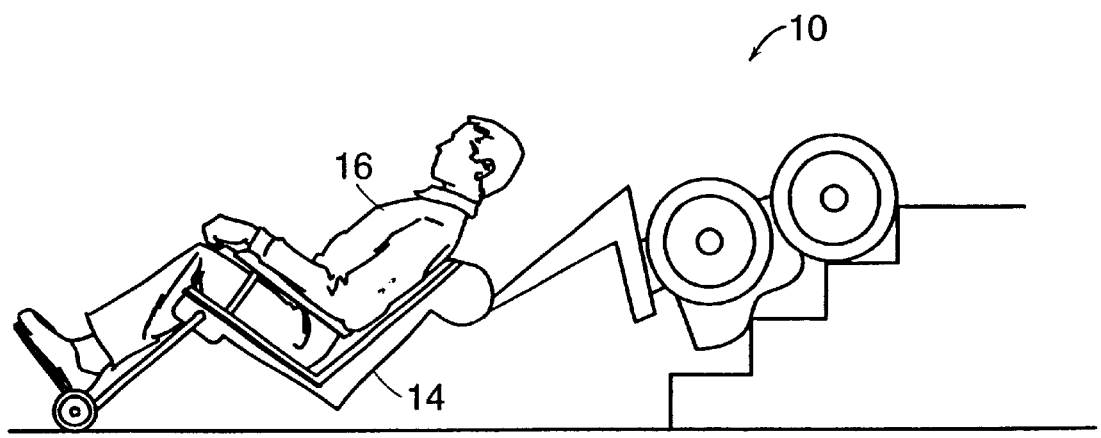
FIG. 19 is a side view of the wheelchair-type vehicle tipping as in FIG. 16 employing an embodiment of the current invention showing a final stage of separation of the body support forward of the ground contacting assembly.

FIGS. 16–19 show vehicle 10 responding to a forward fall down a flight of stairs 56 by separation of body support 14 from ground contacting assembly 18 in accordance with an embodiment of the invention. FIG. 16 shows the initial stage of the forward fall, prior to separation of body support 14 from ground contacting assembly 18. FIG. 17 shows the separation of body support 14 from ground contacting assembly 18 about pivot 20, while FIG. 18 shows a further stage of separation, and FIG. 19 shows the final state of repose of vehicle 10, with passenger 16 shown supported by body support 14 in a substantially upright and protected orientation, despite the complete overturn of ground contacting assembly 18.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A safety mechanism for protecting a passenger of a vehicle having a ground contacting assembly characterized by a fore-aft plane and a body support, the body support having a center of gravity, in a situation wherein the vehicle undergoes undesirable tipping in the fore-aft plane defined by a direction of motion and the vertical, the safety mechanism comprising:
   a. a connector for coupling the body support and the ground contacting assembly;
   b. a release for decoupling motion of the center of gravity of the body support along at least one axis from motion of the ground contacting assembly; and
   c. an actuator for unleashing the release in automatic response to the undesirable tipping of the ground assembly.

2. A safety mechanism according to claim 1, wherein the connector allows free motion of the body support in a fore-aft direction with respect to the ground contacting assembly.

3. A safety mechanism according to claim 1, wherein the connector allows rotation of the body support about a horizontal axis perpendicular to a fore-aft direction.

4. A safety mechanism according to claim 2, wherein the connector includes a pneumatic cylinder.

5. A safety mechanism according to claim 2, wherein the connector includes a slide mechanism.

6. A safety mechanism according to claim 1, further comprising a rotary actuator for rotating the body support with respect to the ground contacting assembly such as to counteract the effect of a roll of the ground contacting assembly on an orientation of the body support with respect to a vertical direction.

7. A safety mechanism according to claim 6, wherein the rotary actuator is a motor.

8. A safety mechanism according to claim 1, further comprising a pilot wheel assembly coupled to the body support.

9. A safety mechanism according to claim 8, wherein the pilot wheel assembly includes at least one wheel.

10. A safety mechanism according to claim 8, wherein the pilot wheel assembly includes a self-leveling mechanism.

11. A safety mechanism according to claim 1, wherein the release includes a reservoir of mechanical energy coupled to at least one of the ground contacting assembly and the body support such that the mechanical energy is used to decouple motion of the center of gravity of the body support from motion of the ground contacting assembly.

12. A safety mechanism according to claim 11, wherein the reservoir of mechanical energy is a spring.

13. A safety mechanism according to claim 12, wherein the spring is a torsion spring.

14. A safety mechanism according to claim 1, further comprising a damper for absorbing energy for minimizing impact of the undesired acceleration on the passenger.

15. A method for protecting a passenger of a personal vehicle having a ground contacting assembly and a body support in a situation wherein the ground contacting assembly undergoes undesirable tipping in a fore-aft plane defined by a direction of motion and the vertical, the method comprising:

a. sensing the undesired tipping in the fore-aft plane, and b. decoupling motion of the center of gravity of the body support from motion of the ground contacting assembly with respect to at least one axis.

* * * * *